US006819762B2

(12) United States Patent
Jones et al.

(10) Patent No.: US 6,819,762 B2
(45) Date of Patent: Nov. 16, 2004

(54) IN-THE-EAR HEADSET

(75) Inventors: Andrew R. Jones, Roslindale, MA (US); Andrew G. Ziegler, Arlington, MA (US); Charles M. Marshall, North Andover, MA (US); Timothy E. White, Acton, MA (US)

(73) Assignee: Aura Communications, Inc., Wilmington, MA (US)

( * ) Notice: Subject to any disclaimer, the term of this patent is extended or adjusted under 35 U.S.C. 154(b) by 474 days.

(21) Appl. No.: 09/950,285

(22) Filed: Sep. 10, 2001

(65) Prior Publication Data

US 2002/0131585 A1 Sep. 19, 2002

Related U.S. Application Data

(60) Provisional application No. 60/276,709, filed on Mar. 16, 2001.

(51) Int. Cl.[7] .......................... H04M 1/00; H04R 25/00
(52) U.S. Cl. ...................................... 379/430; 381/380
(58) Field of Search ...................... 379/430; 455/575.2; 381/328, 380, 330, 381

(56) References Cited

U.S. PATENT DOCUMENTS

| 1,668,910 A | 5/1928 | Jones |
| 1,893,143 A | 1/1933 | Koch |
| 1,953,437 A | 4/1934 | Schier ........................ 181/23 |
| 3,041,856 A | 7/1962 | Neal ............................. 63/14 |
| 4,429,194 A | 1/1984 | Kamon et al. .............. 179/182 |
| 5,142,587 A | 8/1992 | Kobayashi .................. 381/187 |
| 5,712,453 A | 1/1998 | Bungardt et al. ........... 181/135 |
| 5,953,435 A | 9/1999 | Mullin et al. ............... 381/380 |
| 6,718,043 B1 * | 4/2004 | Boesen ....................... 381/328 |

FOREIGN PATENT DOCUMENTS

| EP | 421 681 | 10/1991 |

OTHER PUBLICATIONS

Product Description, JABRA EarBoom™, *JABRA Products*: http://jabra.com/products/jabraearboom.htm (downloaded Dec. 6, 2001).

Product Description, Headset with Earboom™ by JABRA®, *Sprint PCS*, 2001.

* cited by examiner

*Primary Examiner*—Jack Chiang
(74) *Attorney, Agent, or Firm*—Hamilton, Brook, Smith & Reynolds, P.C.

(57) ABSTRACT

An ear mounted speaker assembly provides improved internal and external stability of a "in-the-ear" headset. A housing containing a speaker further contains an extender, audio portion and electrical compartment. The extender is adapted to rest in the intertragic notch of the ear. The audio portion is mounted to the extender and is of greater width than the extender. The audio portion is adapted to be positioned within the lower concha behind the tragus and antitragus of the ear. The compressible retainer extends from the surface of the housing and presses against the upper concha of the ear. The strut extends from the lower surface of the housing below the extender and extends downward outside the intertragic notch and presses against skin to stabilize the speaker assembly within the ear. Compressible retainers may be interchangeable and may come in a kit containing a plurality of interchangeable compressible retainers of a variety of shapes.

19 Claims, 14 Drawing Sheets

FIG. 8A
FIG. 8B
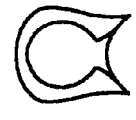
FIG. 8C
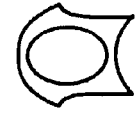
FIG. 8D
FIG. 8E
FIG. 8F
FIG. 8G
FIG. 8H
FIG. 8I
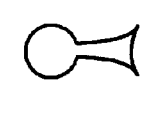
FIG. 8J

IN-THE-EAR HEADSET

RELATED APPLICATION

This application claims the benefit of U.S. Provisional Application No. 60/276,709, filed on Mar. 16, 2001, the entire teachings of the above application is incorporated herein by reference.

BACKGROUND OF THE INVENTION

Two basic styles of headsets have become common in the industry, "on-the-ear" and "in-the-ear." The distinction between the two headsets is identified by the means of attaching the headset to the ear. An "on-the-ear" headset, generally has a plastic, wire hook or loop that attaches around the ear close to the head and hangs the headset on the ear. "On-the-ear" headsets rely on the "ear hook" for stabilization and speaker positioning. An "in-the-ear" headset mounts inside the ear or concha, often within the tragus slot.

There are several disadvantages when using "on-the-ear" headsets. First, it is confusing and awkward for the user to install the over the ear device. Typically these stabilizers are semicircular in shape and extend over the top of and behind the ear much like the supports for eyeglasses. These stabilizers are undesirable because they are awkward to use, interfere with eyeglasses, and do not fit a wide range of user sizes. Second, the "on-the-ear" headset has poor acoustic coupling to the ear canal, a condition that requires a larger speaker and/or more power to drive the speaker to provide sufficient volume. The disadvantage of increased power usage is not usually a major concern for wired devices but greatly reduces battery life for mobile phone users.

"In-the-ear" headsets, also referred to as ear bud or concha style head sets, position the speaker inside the concha, in close proximity to the ear canal, between the inner surfaces of the tragus slot and concha wall to retain the speaker. This configuration operates with lower speaker drive power and has improved acoustic security as a direct result of their improved coupling to the user's ear. The speaker size is limited by the size of the cavum of the concha. Unfortunately, conventional concha style headsets are significantly affected by anatomical differences among people. Seemingly minor size and shape variations of the concha result in either an instability for many users whose conchas either do not hold the headset tightly enough, or discomfort with those with smaller conchas. To overcome these issues, concha style headsets have been designed for a minimum size concha with added external over the ear stabilizers. While this corrects for the instability problem, it sacrifices convenience, performance, and ergonomic fit of the speaker.

There have been various forms of stabilizing "in-the-ear" headset within the concha. One form of stabilization is to "custom-fit" multiple molded elastomeric inserts to accommodate variations in the ear anatomy. These require a significant amount of "fitting" to seat the speaker comfortably in the ear and requires different left and right ear inserts. Another form, as seen in U.S. Pat. No. 5,712,453, is to use an attachment to a cushion that fits over the speaker to push against the inside of the upper concha, thus pushing the headset deeper into the intertragic slot. Because of its location, the cushion attachment to the audio portion on the headset and structural limitations in attaching to the speaker fails to adequately achieve a fully stable design and good ergonomic fit. Another form, as seen in U.S. Pat. No. 5,953,435, is to use a conchal wall hook that slides perpendicularly from the rear of the headset and pushes against the inside of the upper concha, also pushing the headset deeper into the intertragic slot.

SUMMARY OF THE INVENTION

In accordance with the invention, there is provided an ear mounted speaker assembly which provides improved internal and external stability of an "in-the-ear" headset.

In an ear mounted speaker assembly, a housing contains a speaker, and the housing comprises an extender adapted to rest in the intertragic notch of the ear and an audio portion mounted to the extender and of greater width than the extender. The audio portion is adapted to be positioned within the lower concha behind the tragus and antitragus of the ear. A compressible retainer extends from the surface of the housing and presses against the upper concha of the ear. A strut extends from the lower surface of the housing and extends downward outside the intertragic notch and presses against skin to stabilize the speaker assembly within the ear.

The ear mounted speaker assembly may, for example, be a wireless communications headset with a microphone boom, a headset for an audio component, or a communications headset with a stylus for a personal digital assistant device. A battery charger may be provided for charging the wireless communications headset. The ear mounted speaker assembly may be compatible for either the right ear or left ear.

In one embodiment, the housing contains an electrical compartment connected to the extender opposed to the audio portion. A microphone boom extends downward from the end of the electrical compartment, and a microphone is located in the end of the microphone boom. The microphone boom may also be used as a stylus for a writing instrument.

The extender and audio portion may be asymmetrically shaped. The extender and audio portion may contain a rotational joint to provide rotation relative to each other to enable the positioning of the audio portion within the lower concha.

The compressible retainer may extend from the surface of the housing outside the audio portion to extend outside the crux of helix of the ear and press against the upper concha of the ear. Compressible retainers may be interchangeable and may come in a kit containing a plurality of interchangeable compressible retainers of a variety of shapes.

The interchangeable retainer may contain a connecting element and a compressible structure. The connecting element may be connected to the ear mounted speaker assembly. The compressible structure may connected by the connecting element at an angle with respect to the assembly to press against the upper concha of the ear. The connecting element maybe of any shape used in the industry for joining with a slot in the housing, but one structure is dovetailed in shape. The compressible structure may come in a variety of shapes, but one structure is loop shaped.

The interchangeable strut may contain a mating element and stabilizing structure. The mating element may be connected to the ear mounted speaker assembly. The stabilizing structure may be in connection with the mating element to press against the skin. The mating element may be of any shape used in the industry, but a one structure is either dovetailed in shape or a ball joint. The stabilizing structure may come in a variety of shapes, but the one shape is bow shaped.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 8A–J shows various shapes of the retainer.

DETAILED DESCRIPTION OF THE INVENTION

Figure 1A:
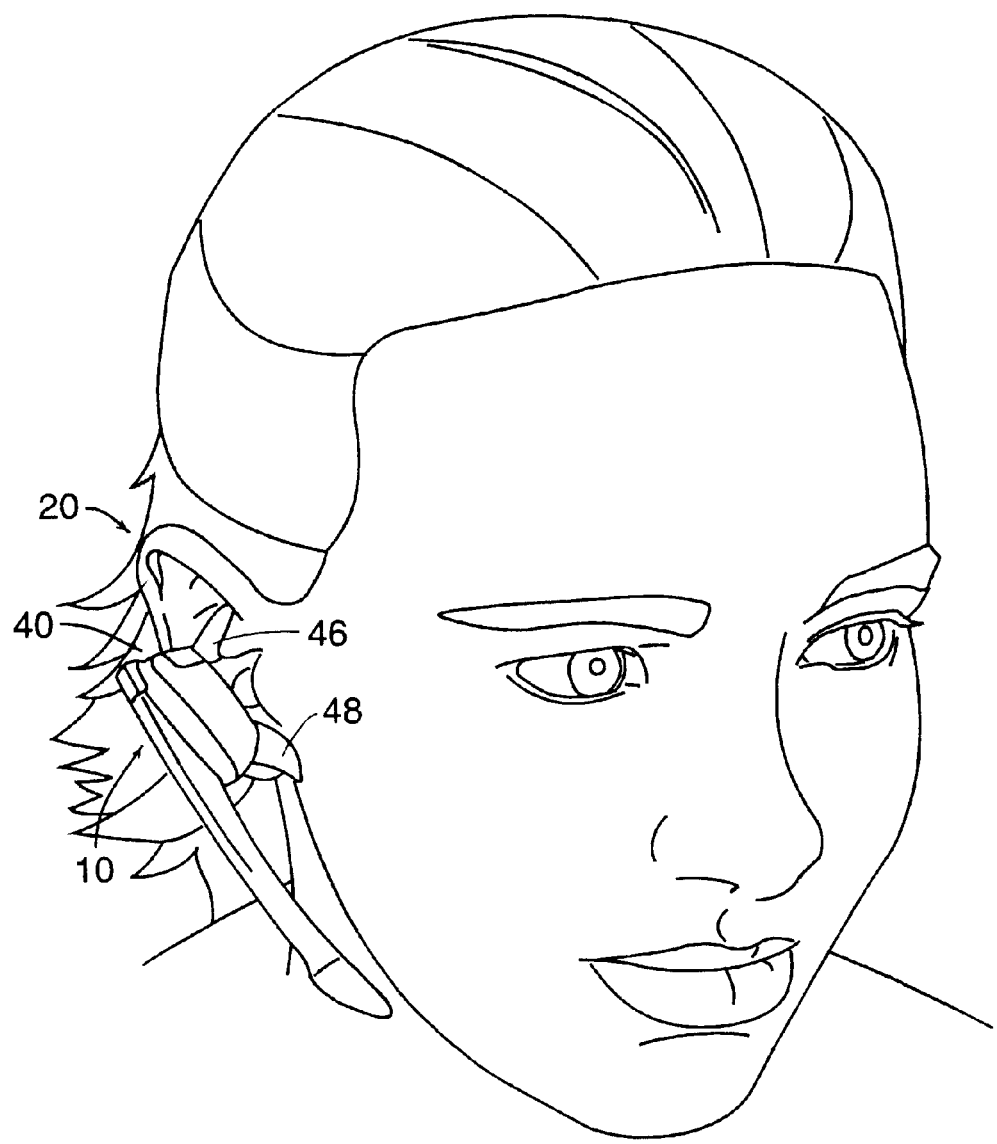
FIGS. 1A–E shows a perspective, front, side, top and detailed view of the ear mounted speaker assembly mounted within the ear.
Figure 1B:
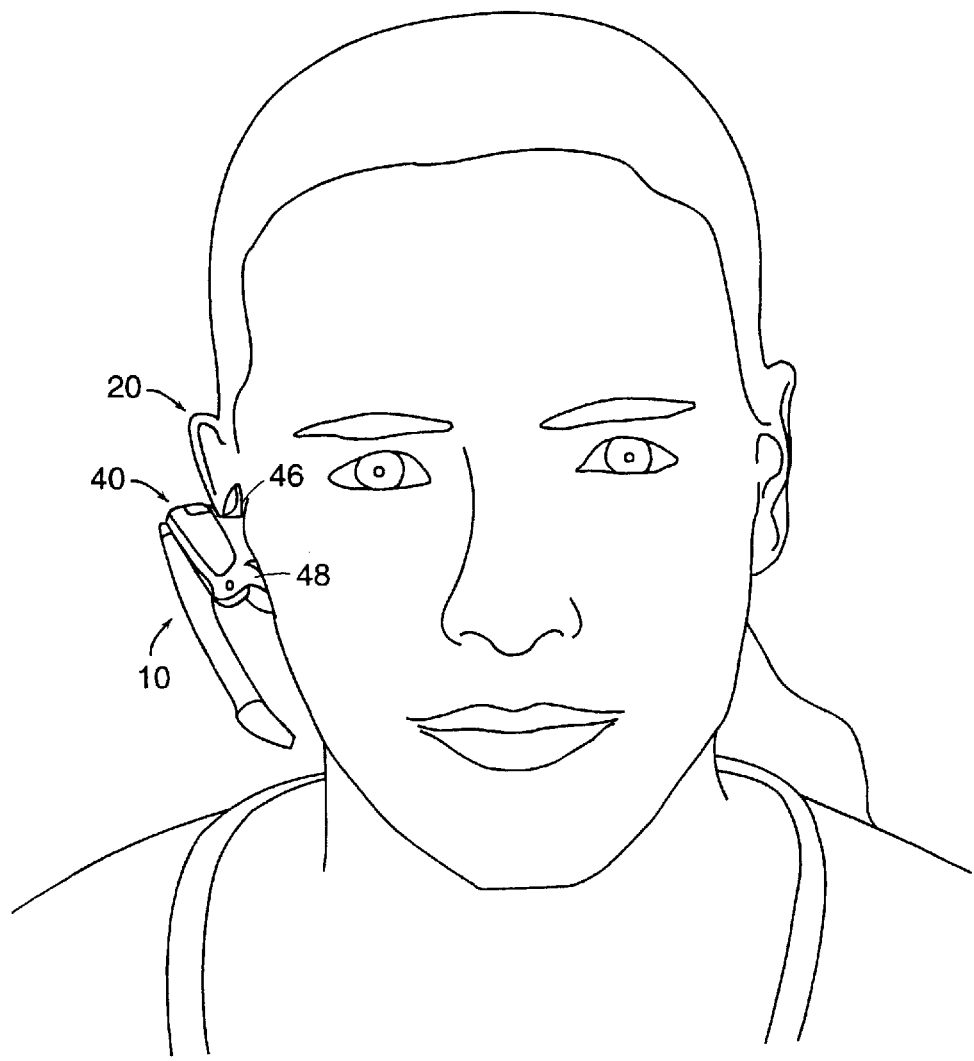
Figure 1C:
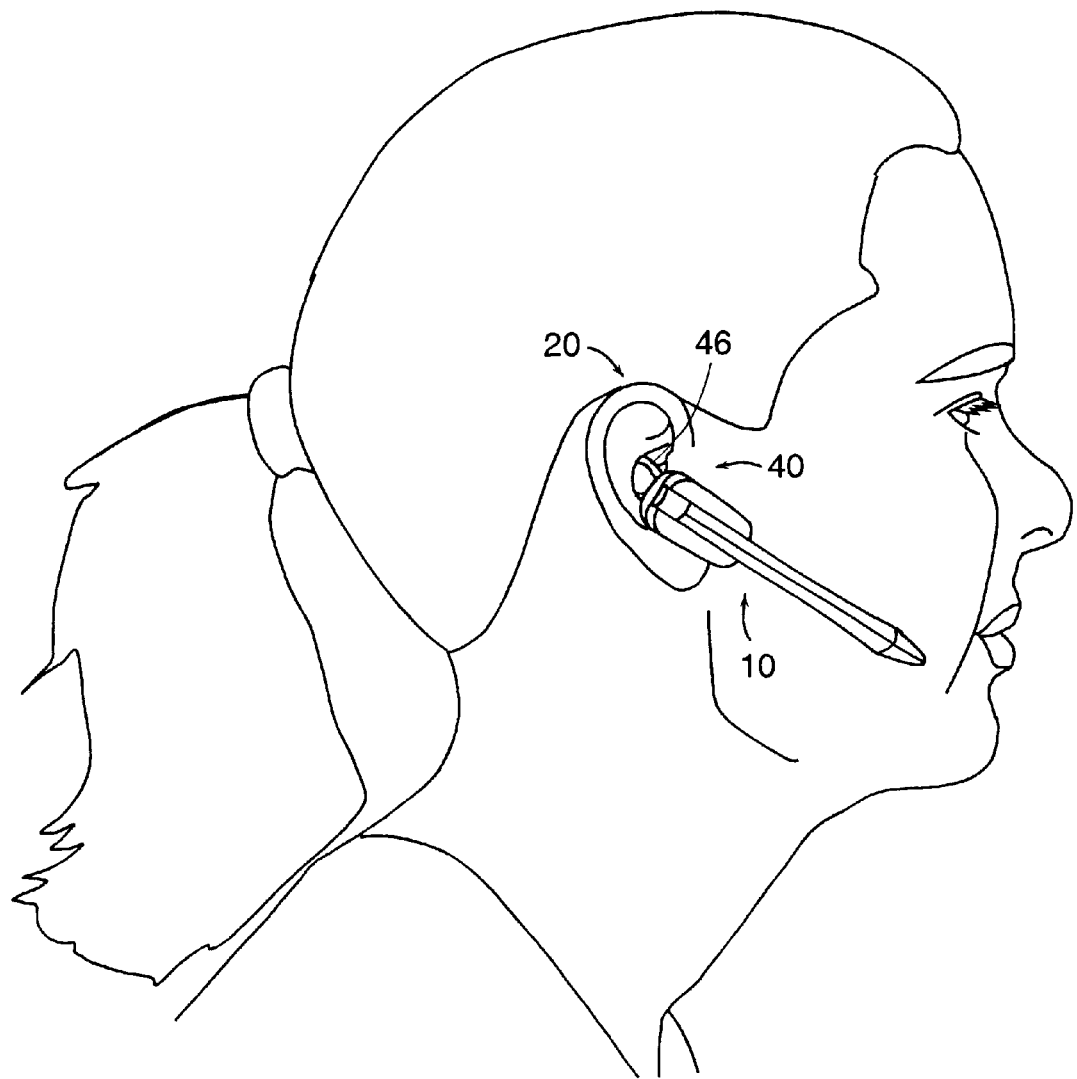

A description of preferred embodiments of the invention follows.

In general, FIGS. 1A–E refer to an embodiment of the invention where the ear mounted speaker assembly ("assembly") 10 is held securely within the ear 20 by a housing 40. More specifically, the retainer 46 and strut 48 stabilize the assembly 10 within the lower concha of the ear 20. Ergonomic studies have identified 15 grams with a center of gravity located 1.5 cm from the concha 22 inner surface and aligned within 1 mm of the intertragic notch as a practical limit for the assembly 10 to be stable.

FIGS. 2 through 6C refer to a more detailed description of the assembly 10 and the ear 20. The housing 40 includes an audio portion 44, on and extender 42 and may include an electrical compartment 50. The electrical compartment 50 encloses electronics 58 and a battery 56 and, in one embodiment, a speaker.

The electrical compartment 50 is accessible through the electrical compartment door 52. The electrical compartment 50 houses batteries 56 and electronic board 58 needed for use in a wireless application. To keep the center of gravity close to the ear 20, the heavier battery 56 is positioned toward the speaker 45 from the electronics board 58. A volume control 61 is located on the electrical compartment 50 to control the volume of the speaker 45. The assembly 10 is compatible to fit either the right or left ear. Alternatively, the assembly 10 may be constructed to fit preferentially on either the right or left ear.

The housing 40 is comprised of a extender 42, a audio portion 44, which preferably houses the speaker 45. Alternatively, the speaker 45 may be contained in the extender 42 or electrical compartment 50 with the acoustic energy from the speaker 45 channeled through the audio portion 44. The extender 42 is shaped to fit within the intertragic notch 24 of the ear 20 as the speaker 45 rests behind the tragus 30 and antitragus 32. The extender 42 may be notched to fit comfortably within the intertragic notch 24 of the ear 20. The extender 42 may be of triangular cross-section, teardrop, circular or asymmetrically shaped to provide improved stability within the ear 20.

Figure 1D:
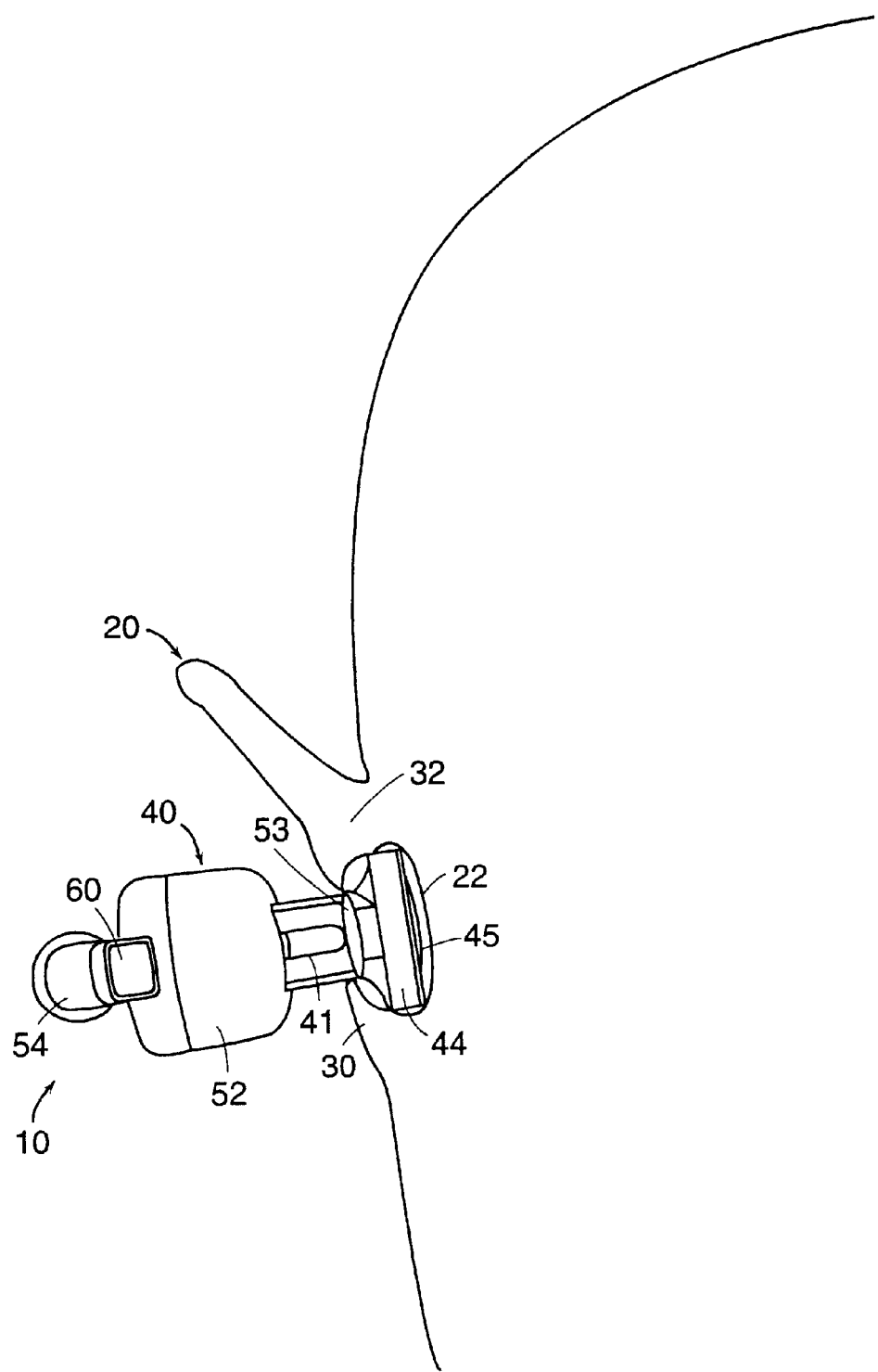
Figure 1E:
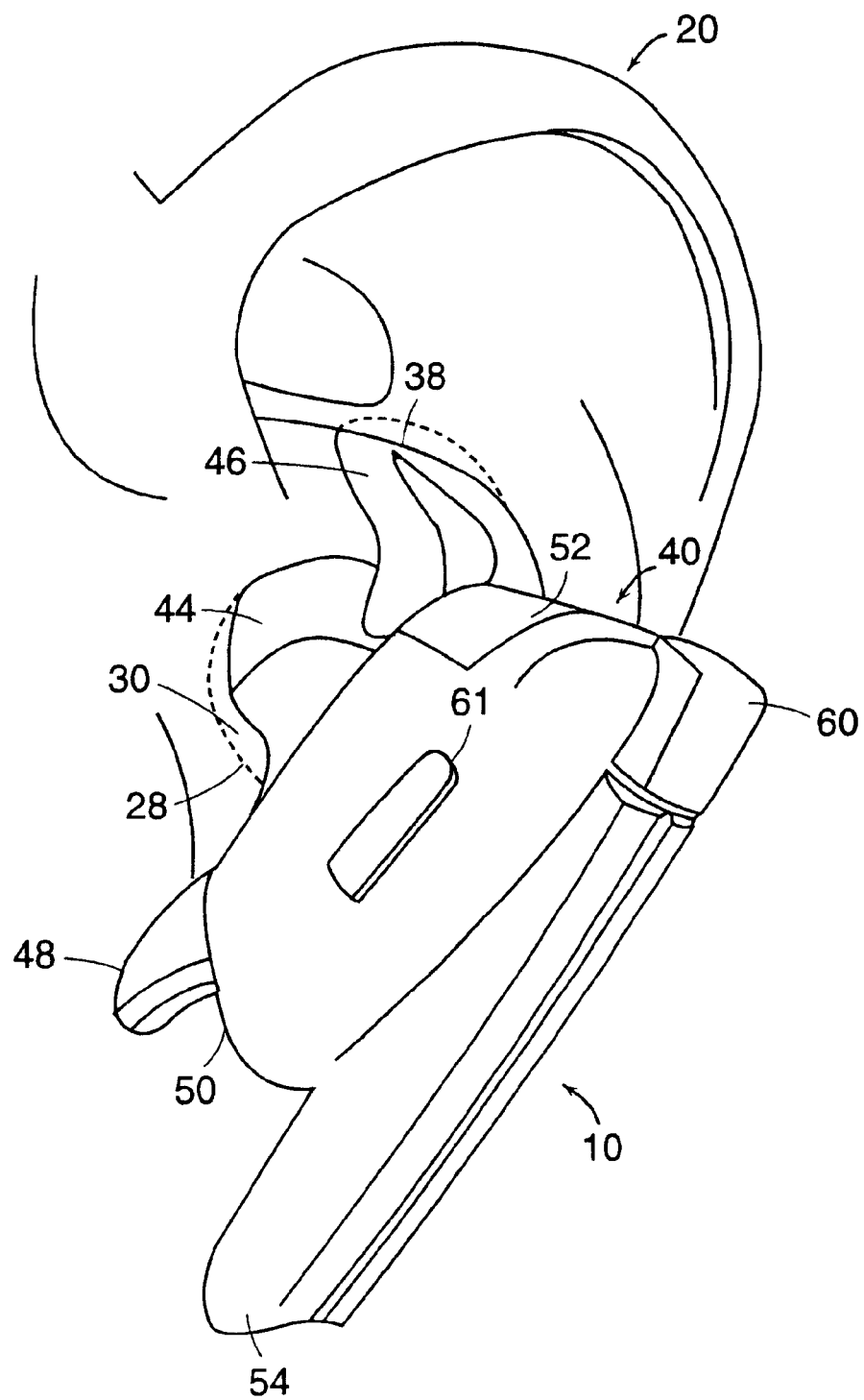
Figure 2:
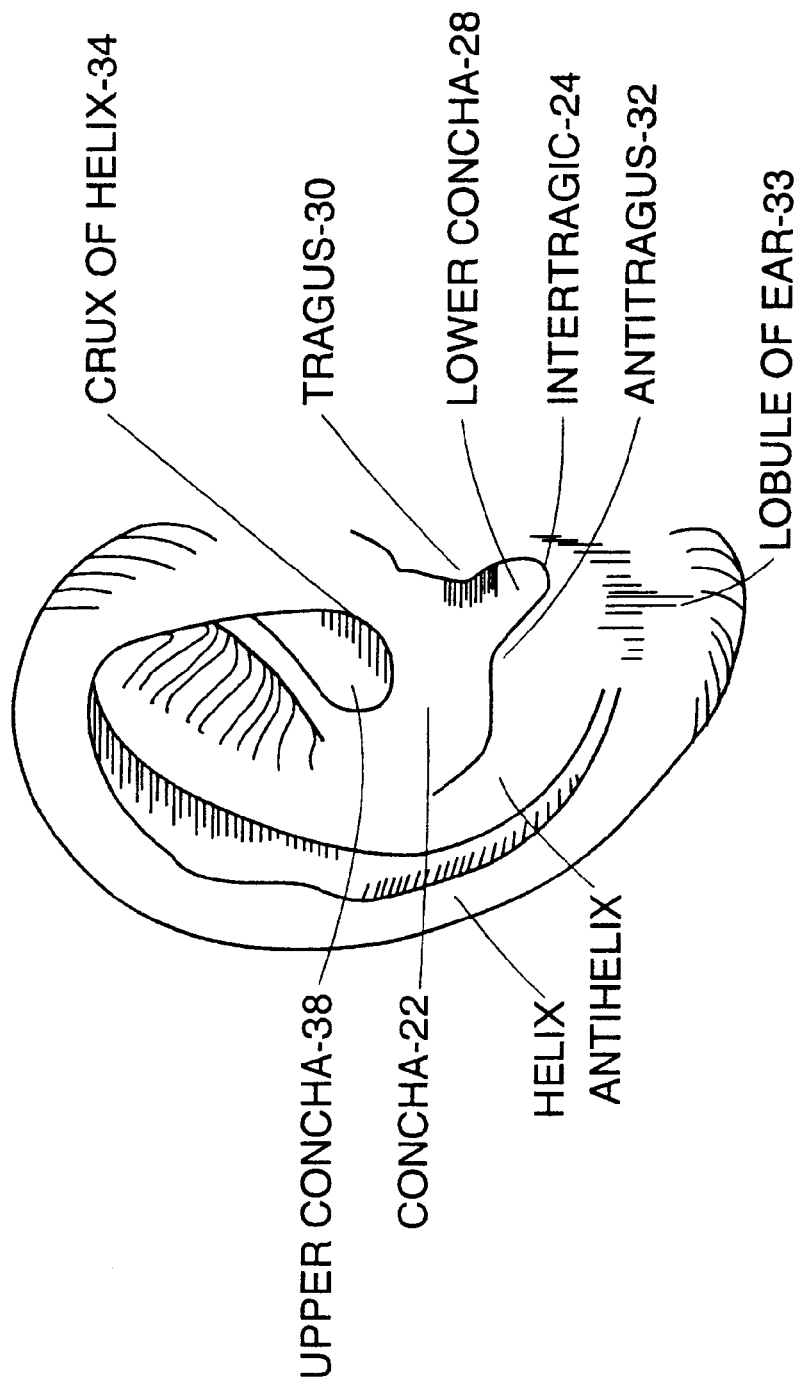
FIG. 2 shows a detailed anatomy of the outer ear.
Figure 3A:
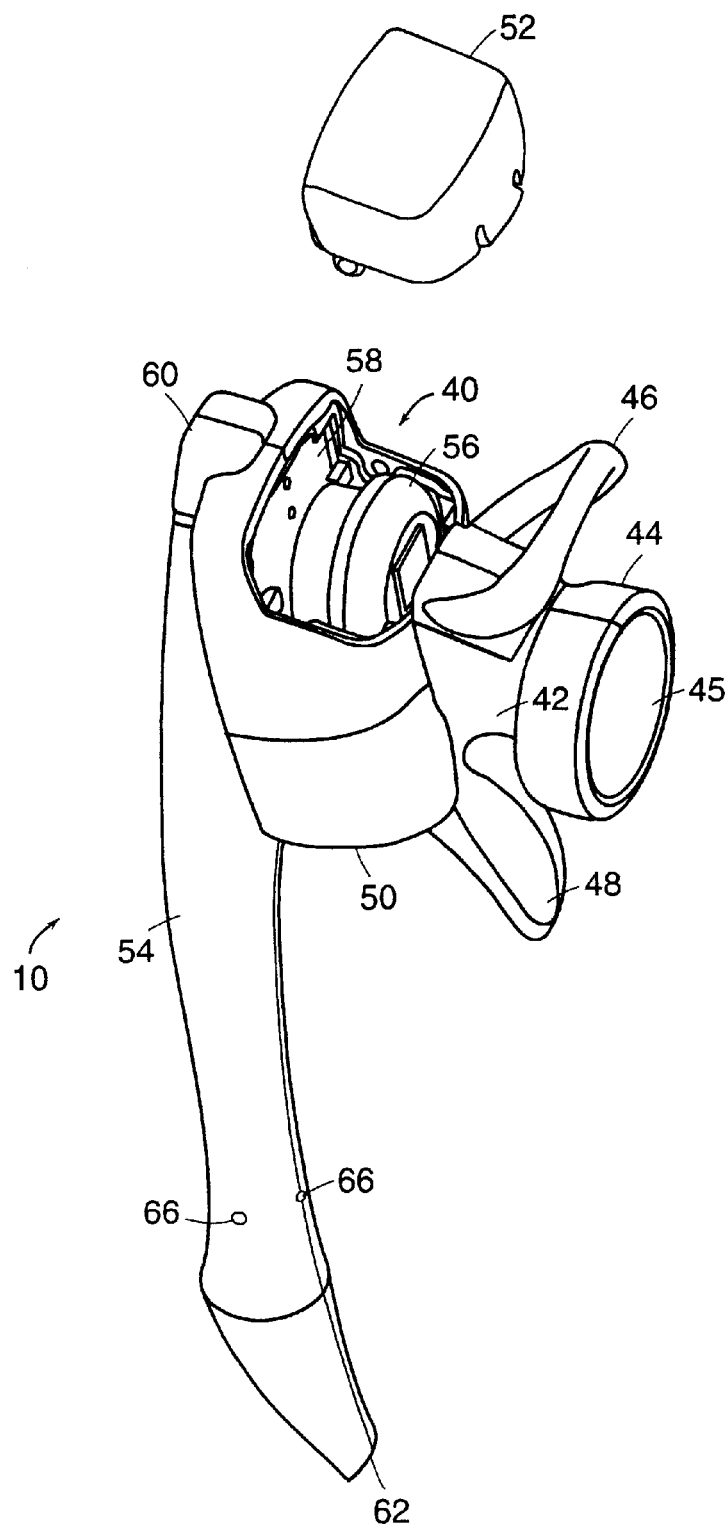
FIGS. 3A–B show a perspective views of the ear mounted speaker assembly.
Figure 3B:
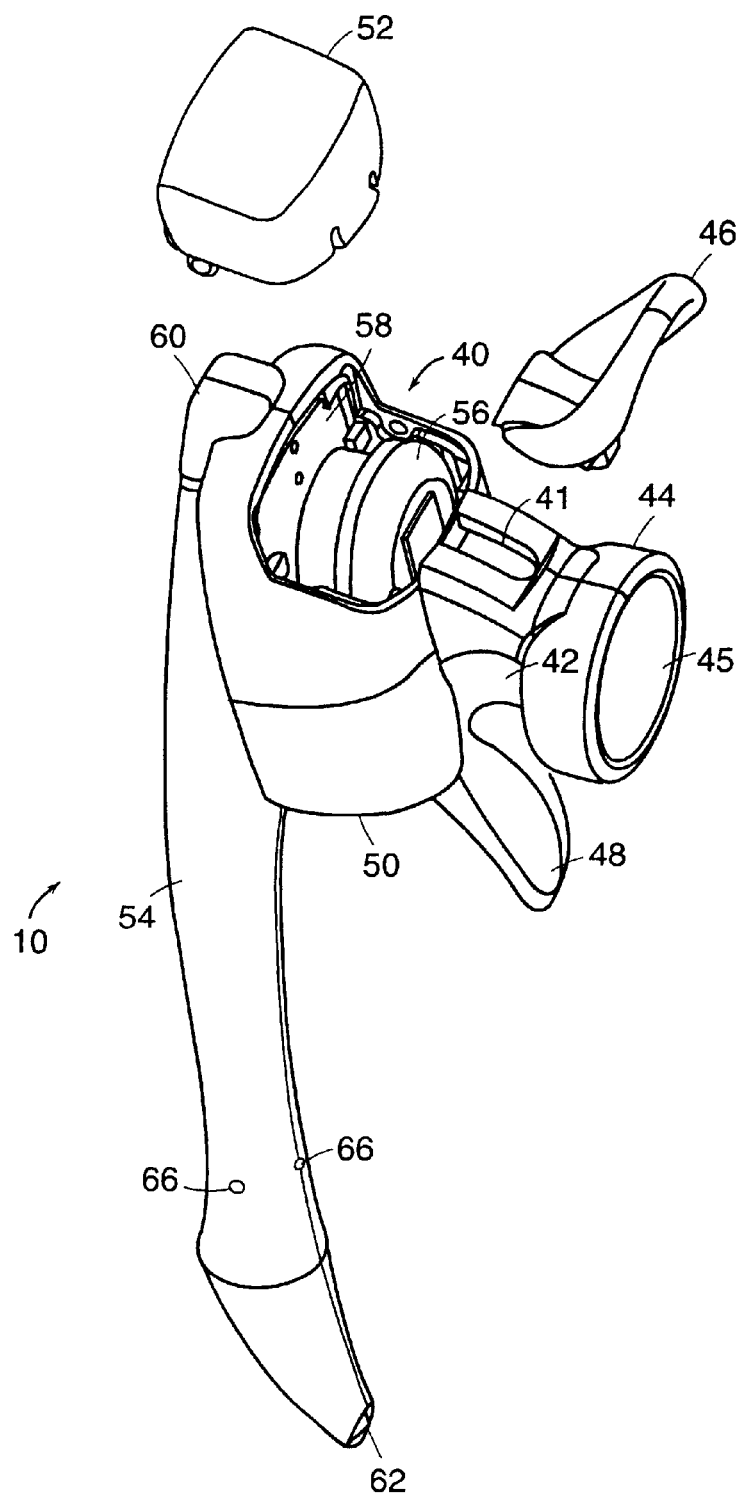
Figure 4B:
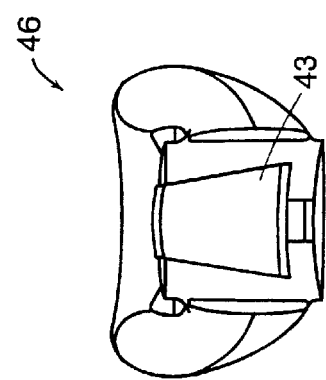
FIGS. 4A–C show a perspective views of the compressible retainer.
Figure 4C:
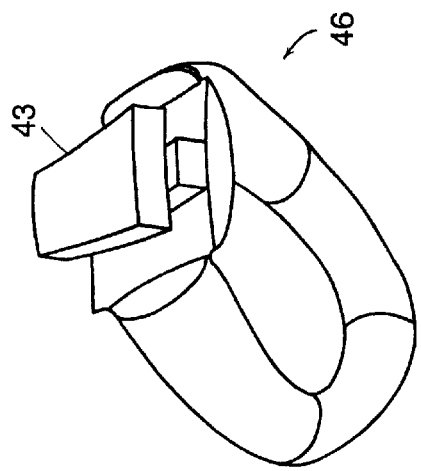
Figure 4A:
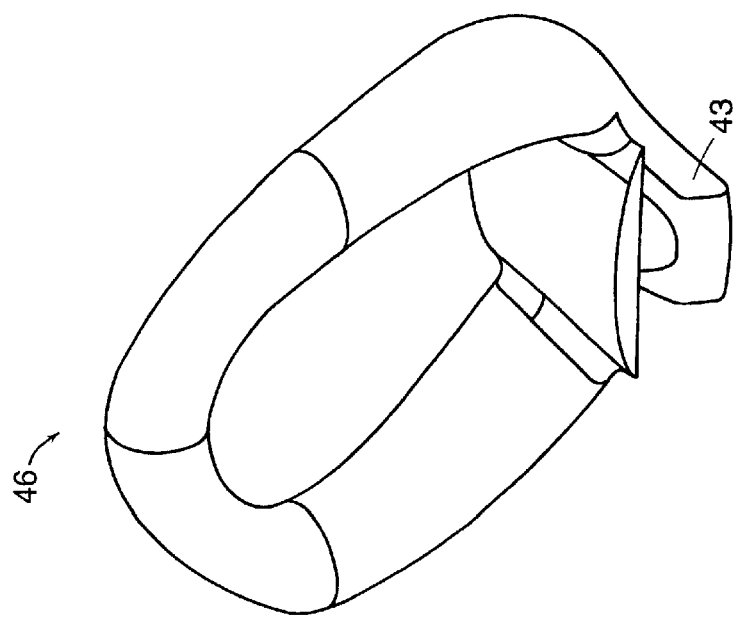

The lower concha 23 and intertragic notch 24 define a wedge-shaped space with an apex pointing generally toward the chin. To provide improved stability the audio portion 44 is attached to the extender 42 and slides behind the tragus 30 and antitragus 32 while resting within the lower concha 28 of the ear 20. The audio portion 44 may be of triangular, teardrop, circular or asymmetrical shape, which will properly position the assembly 10 and provide improved stability within the ear 20. The audio portion 44 may be attached to the housing 40 by a rotational joint 53 which allows the audio portion 44 to rotate within the concha 22 providing a comfortable fit within the ear 20. In an alternative embodiment, as shown in FIG. 1D, a rotational joint 53 may be contained in the extender 42 to position the audio portion 44 within the lower concha 28 of the ear 20. The rotation may be in two dimensions or in three dimensions, such as would be provided by a ball joint. The audio portion 44 may be covered with a foam or compliant pad 55 to provide conformal cushioning within the ear 20. The design of the audio portion 44 positions the speaker 45 within the concha 22 such that good acoustical coupling between the speaker 45 and the ear 20 is achieved. The audio portion 44 may deliver audio to the ear canal either directly from a speaker 45 in the audio portion 44 or may provide acoustical coupling from a displaced speaker. The foam or compliant pad 55, may be made in various thicknesses or stiffnesses to compensate for differences of the ear of the user of the assembly 10.

Figure 5D:
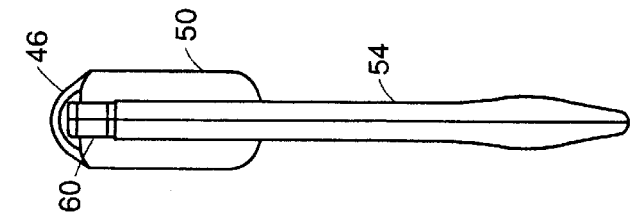
FIGS. 5A–E show front, side, rear and top views of the ear mounted speaker assembly.
Figure 5F:
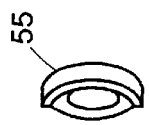
FIG. 5F shows a removable foam pad.
Figure 5C:
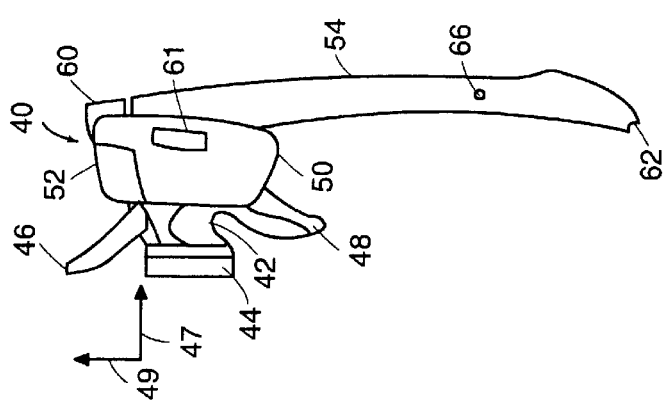
Figure 5E:
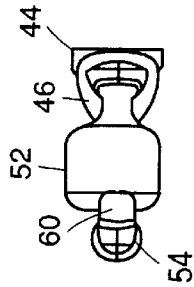
Figure 5B:
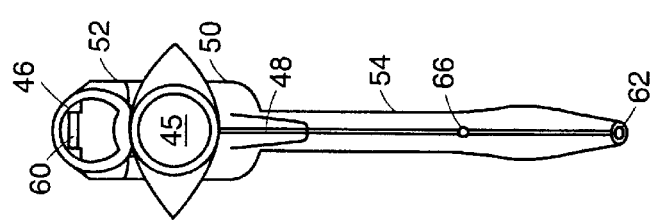
Figure 5A:
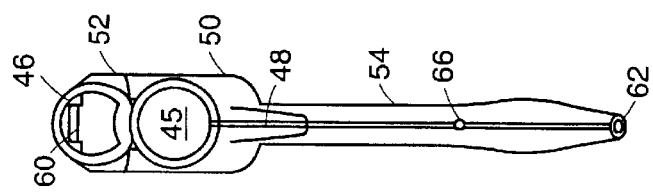
Figure 6C:
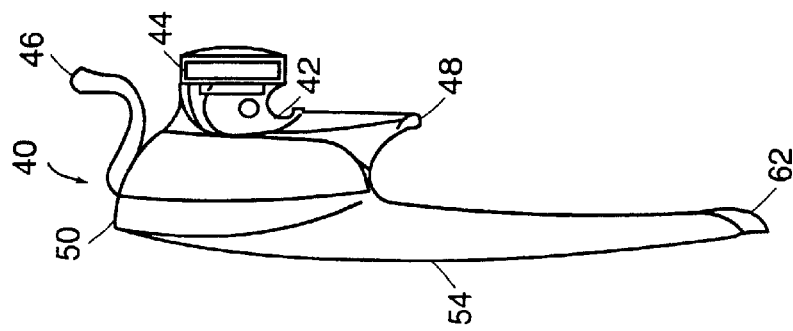
FIGS. 6A–C show side views of the compressible retainer mounted to the housing and electrical compartment.
Figure 6B:
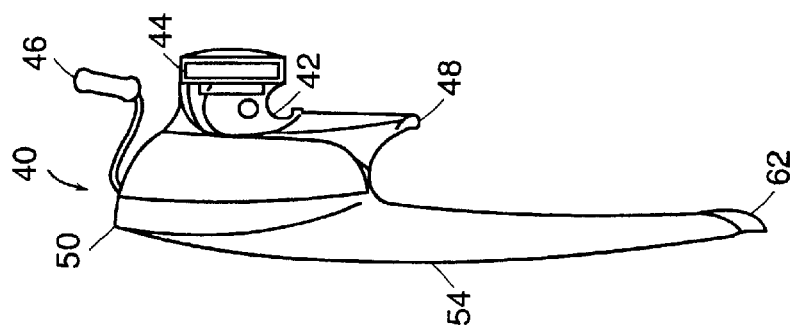
Figure 6A:
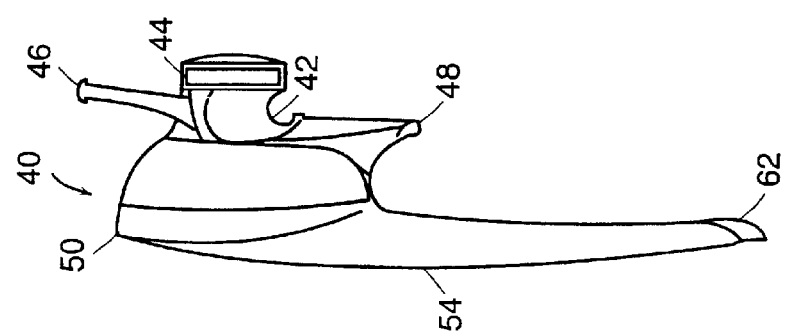
Figure 7D:
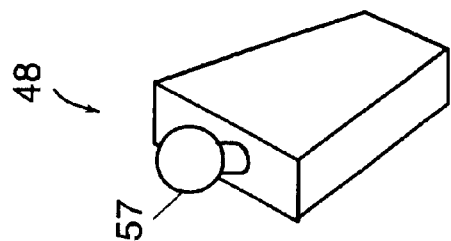
FIGS. 7A–D show perspective views of the strut.
Figure 7C:
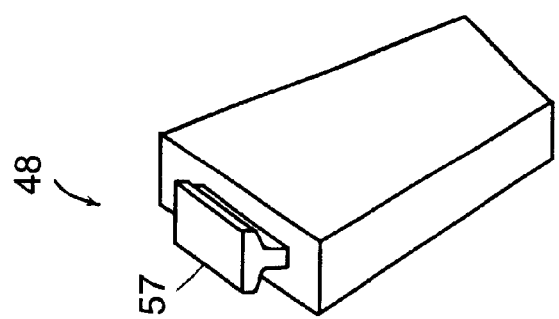
Figure 7B:
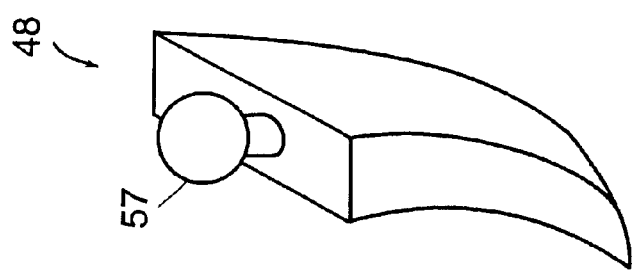
Figure 7A:
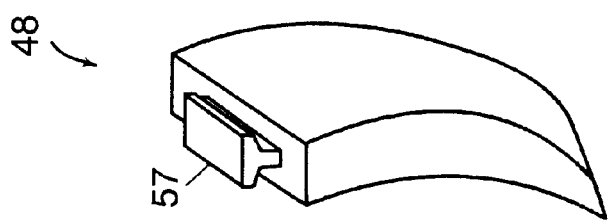

As shown in FIG. 6A, a compressible retainer 46 is part of the top of the housing 40 to apply force on the upper concha 38 resulting in an equal and opposite force pushing the assembly 10 deeper into the intertragic notch 24, greatly enhancing stability in the ear 20. The compressible retainer 46 may also be attached to the electrical compartment 50 as shown in FIGS. 5B–C. This reduces the likelihood of the assembly 10 falling out of the ear 20, away from the concha 22, particularly under conditions when the head is moved. The compressibility of the retainer 46 accommodates variations in concha and ear size and ensures adequate downward pressure is applied within the intertragic notch 24. As shown in FIG. 5C, the optimal design of the compressible retainer 46 is stiff along one axis 47 and compressible along a second axis 49 in order to ensure proper ergonomic fit within the concha 22 while achieving the required stability of the assembly 10. The compressible retainer 46 is located outside of the audio portion 44 and speaker 45 on the assembly 10 and enables the compressible retainer 46 to be angled with respect to the surface of the audio portion 44 and center line of the assembly 10. This avoids interference with the crux of helix 34 and provides a more secure fit within the concha 22 while ensuring that adequate downward force is achieved by the assembly 10 within the intertragic notch 24.

The compressible retainer 46 is interchangeable to accommodate variations in concha and ear size. A mounting slot 41 is located on the top of the housing 40 for accepting a dovetailed end 43 of the compressible retainer 46 to hold the retainer to the housing 40. When the electrical compartment door 52 is open, the compressible retainer 46 may be removed by sliding the retainer toward the electrical compartment 50. A kit of interchangeable compressible retainers 46 may be provided in a variety of shapes not limited to the shapes shown in FIGS. 8A–J. Although loop shape is preferred, a variety of shapes of interchangeable compressible retainers 46 is provided to accommodate various concha and ear sizes of the user. Rubber is the preferred material in manufacturing the compressible retainer 46. However, the compressible retainer 46 may be manufactured from a variety of materials well known to those versed in the art, included but not limited to materials found elsewhere in the assembly 10.

A strut 48 is part of the underside of the assembly 10 below the housing 40 and rests on the exterior surface of the antitragus 32 and may extend onto the lobule 33 or the face. The strut 48 supports the assembly 10 on the outside surface of the ear 20 to further stabilize the assembly 10 within the lower concha 23 and intertragic notch 24 of the ear 20. The strut 48 stabilizes the assembly from putting outward or spreading forces on the antitragus 32, which for some ear sizes and shapes may destabilize the assembly 10, particularly when the head of the user is subject to motion. Furthermore, the weight or moment of inertia of the assembly 10 may further destabilize the assembly 10. The strut 48 further enables positioning of the microphone boom 54 away from the cheek and optimally positions the microphone 62 relative to the face.

As seen in FIGS. 7A–D, the strut 48 is interchangeable to accommodate the various sizes of the users ear 20, lobule 33 and face. The strut 48 may alternatively contain a flexible or pivot joint 57 to enable optimal positioning of the strut against the skin. Attachment may be by means similar to the compressible retainer 46 or by a variety of means well known to those skilled in the art. Although "bow" shape is preferred, a kit of struts 48 may be provided in a variety of shapes, including but not limited to a "solid" structure, post, multiple posts or loop structures similar to that of the retainer 46, or any other such similar configuration provided that such a design presses against the exterior surface of the ear 20 (including at least one of the tragus 30, antitragus 32, and lobule 33) or face and serves to stabilize the assembly 10 within the intertragic notch 24. The strut 48 provides support for the weight of the assembly 10, any residual moment force due to the compressible retainer 46, and in particular the weight of the assembly 10 when there is a microphone boom 54, a wire (not shown) or any other structure that creates a force that could serve to destabilize the assembly 10 within the ear 20.

The strut 48 may be manufactured from a variety of materials well known to those versed in the art, included but not limited to hard plastic materials found elsewhere in the assembly 10. Alternatively, the strut 48 may be compressible, open cell or foam pad located on the assembly 10 to perform substantially the same function.

The microphone boom 54 has a typical maximum dimension of 9 cm from the speaker 45 to the microphone opening 62 located at the end of the boom. This length permits a rigid assembly that locates the microphone boom 54 correctly as the assembly 10 is placed in the ear 20. A power switch 60 is attached on the top of the microphone boom 54 which turns the assembly 10 on or off. The result is an assembly 10 less than 11 cm long with a center of gravity virtually unaffected by the microphone boom 54.

The users voice and background noise enters the microphone boom 54 at the microphone opening 62 located at the end of the boom. Background noise also enters the microphone boom 54 at noise canceling opening 66 which is located approximately 2.5 to 4.0 cm from the microphone opening 62. A differential microphone is used to separate the users voice from the background noise achieving acoustical balance.

Both the compressible retainer 46 and strut 48 may further serve to position the assembly 10 such that the boom (or other attachment to the assembly 10) is optimally positioned with respect to the mouth to ensure good audio coupling between the microphone 62 contained in the boom and the sound emanating from the mouth.

Figure 9A:
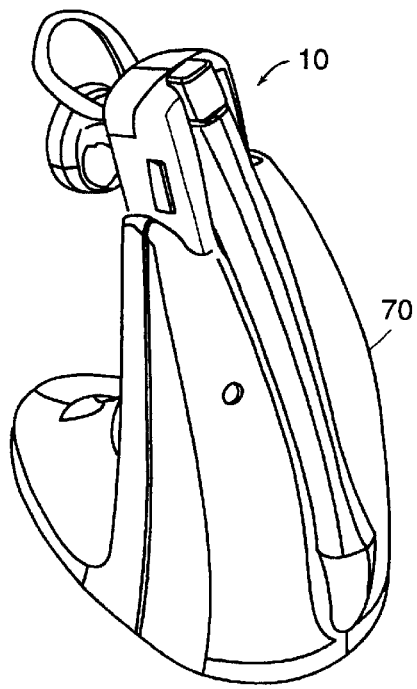
FIGS. 9A–B show perspective views of the ear mounted speaker assembly and battery charger.
Figure 9B:
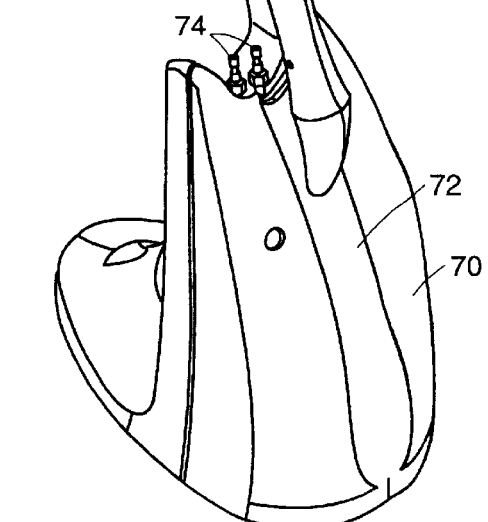

FIGS. 9A–B refer to the assembly 10 and its battery charger 70. When charging, the assembly 10 sits in the cradle 72 of battery charger 70. When in the charging position, the first set of electrodes 74 are in electrical connection with the second set of electrodes in connection with the electronics board 58 of the assembly 10. The battery charger 70 works on non-inductive charging principals to allow for quicker charging time and reduced assembly 10 size. The battery charger 70 may operate on either an internal battery, external A/C or D/C current source.

While this invention has been particularly shown and described with references to preferred embodiments thereof, it will be understood by those skilled in the art that various changes in form and details may be made therein without departing from the scope of the invention encompassed by the appended claims.

What is claimed is:

1. An ear mounted speaker assembly comprising:
    a housing containing a speaker and further comprising:
        a extender adapted to rest in a intertragic notch of an ear;
        an audio portion mounted to the extender and of greater width than the extender, the audio portion adapted to be positioned within a lower concha behind a tragus and an antitragus of an ear;
    a compressible retainer extending from a surface of the housing to press against an upper concha of the ear; and
    a strut extending from a lower surface of the housing to extend downward outside the intertragic notch and press against skin to stabilize the speaker assembly within the ear.

2. The ear mounted speaker assembly of claim 1, wherein the housing further comprises a electrical compartment connected to the extender opposed to the audio portion, and the assembly comprises:
    a microphone boom extending downward from a distal end of the electrical compartment; and
    a microphone located in a distal end of the microphone boom.

3. The ear mounted speaker assembly of claim 1, wherein the ear mounted speaker assembly is a wireless communications headset.

4. The ear mounted speaker assembly of claim 1, wherein the ear mounted speaker assembly is a headset for an audio component.

5. The ear mounted speaker assembly of claim 1, wherein the ear mounted speaker assembly is compatible for either a right ear or a left ear.

6. The ear mounted speaker assembly of claim 1, wherein the extender is asymmetrically shaped.

7. The ear mounted speaker assembly of claim 1, wherein the audio portion is asymmetrically shaped.

8. The ear mounted speaker assembly of claim 1, used in a system, including:
    a battery charger and the ear mounted speaker assembly:
        the battery charger having a set of first electrodes and a charging cradle;
        the ear mounted speaker assembly having a set of second electrodes adapted to provide electrical connection with the first set of electrodes when the ear mounted speaker assembly is in the charging cradle of the batter charger.

9. The ear mounted speaker assembly of claim 1, wherein the speaker assembly is a stylus for a personal digital assistant device.

10. The ear mounted speaker assembly of claim 1, wherein the compressible retainer extends from a surface of the housing outside the audio portion to extend over the crux of helix of the ear to press against an upper concha of the ear.

11. The ear mounted speaker assembly of claim 2, wherein the microphone boom is a stylus for a writing instrument.

12. The ear mounted speaker assembly of claim 1, wherein the compressible retainer is interchangeable.

13. The ear mounted speaker assembly of claim 1, in a kit comprising a plurality of interchangeable compressible retainers of a variety of shapes.

14. The ear mounted speaker assembly of claim 1, wherein the strut is interchangeable.

15. The ear mounted speaker assembly of claim 1, wherein the strut comprises a rotational joint at a proximal end in connection with the housing to enable positioning of a distal end against the skin.

16. The ear mounted speaker assembly of claim 1, in a kit comprising a plurality of interchangeable struts of a variety of shapes.

17. The ear mounted speaker assembly of claim 1, wherein the extender comprises a rotational joint at a distal end in connection with the audio portion to enable positioning of the audio portion in the lower concha of the ear.

18. The ear mounted speaker assembly of claim 1, wherein the audio portion comprises a rotational joint at a proximal end in connection with the extender to enable positioning of a distal end of the audio portion in the lower concha of the ear.

19. An ear mounted speaker assembly comprising:
   housing means for containing a speaker and further comprising:
      extender means for resting in a intertragic notch of an ear;
      audio portion means mounted to the extender means and of greater width than the extender means, the audio portion means for positioning within a lower concha behind a tragus and an antitragus of an ear;
   compressible retainer means extending from a surface of the housing for pressing against an upper concha of the ear; and
   strut means extending from a lower surface of the housing below the extender outside the intertragic notch for pressing against skin to stabilize the speaker assembly within the ear.

* * * * *